United States Patent
Refsell

(10) Patent No.: US 11,497,211 B2
(45) Date of Patent: *Nov. 15, 2022

(54) PESTICIDAL COMPOSITIONS AND METHODS OF USE THEREOF

(71) Applicant: Valent U.S.A. LLC, Walnut Creek, CA (US)

(72) Inventor: Dawn Refsell, Lathrop, MO (US)

(73) Assignee: VALENT U.S.A., LLC, San Ramon, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 16/824,096

(22) Filed: Mar. 19, 2020

(65) Prior Publication Data

US 2020/0296964 A1 Sep. 24, 2020

Related U.S. Application Data

(60) Provisional application No. 62/821,412, filed on Mar. 20, 2019.

(51) Int. Cl.
| | | |
|---|---|---|
| *A01N 37/40* | (2006.01) | |
| *A01N 35/10* | (2006.01) | |
| *A01N 37/26* | (2006.01) | |
| *A01N 43/50* | (2006.01) | |
| *A01N 43/647* | (2006.01) | |
| *A01N 41/06* | (2006.01) | |
| *A01N 43/90* | (2006.01) | |
| *A01N 43/54* | (2006.01) | |

(52) U.S. Cl.
CPC ............ *A01N 43/50* (2013.01); *A01N 35/10* (2013.01); *A01N 37/40* (2013.01); *A01N 41/06* (2013.01); *A01N 43/54* (2013.01); *A01N 43/647* (2013.01); *A01N 43/90* (2013.01)

(58) Field of Classification Search
CPC combination set(s) only.
See application file for complete search history.

(56) References Cited

U.S. PATENT DOCUMENTS

| 7,098,170 B2 | 8/2006 | Asar et al. |
| 2008/0108072 A1 | 5/2008 | Chicoine et al. |
| 2016/0265990 A1 | 9/2016 | Carralero et al. |
| 2018/0007901 A1* | 1/2018 | Massa .................... A01N 37/40 |
| 2018/0255782 A1* | 9/2018 | Cobb .................... A01N 59/06 |

OTHER PUBLICATIONS

MSDS for Ammonium Lignosulfonate [online], (Apr. 9, 1999), retrieved from the internet on [Dec. 18, 2021] from URL: <http://centralsalt.com/pdf/lignosulfonate/lignosulfonate-msds.pdf>.*
International Search Report and Written Opinion for corresponding PCT Application No. PCT/US20/23495 dated May 22, 2020.
NDSU) "General Information" Nov. 2013; [retrieved May 5, 2020). Retrieved from the Internet: <URL: https:l/www.ag.ndsu.edu/weeds/weed-control-guides/nd-weed-control-guide-1 /wcg-files/11-Gen.pdf>; p. 71, heading a4. Roundup I glyphosate; p. 75, first column third paragraph; p. 76, heading a6. Spray carrier water quality; p. 76, heading acidic ams replacement aar adjuvants.
(Micro Flo Company LLC) "Banvel Herbicide" [retrieved May 5, 2020). Retrieved from the Internet: <URL:http://fs1.agrian.com/pdfs/Banvel_(Ad070104)_Label.pdf>; p. 1, heading active ingredient.

* cited by examiner

*Primary Examiner* — John Pak
(74) *Attorney, Agent, or Firm* — Wood, Phillips, Katz, Clark & Mortimer

(57) ABSTRACT

The present invention is directed to pesticidal compositions comprising a pesticide, one or more acidifiers and one or more antagonists of the pesticide. The present invention is further directed to methods of controlling weeds by mixing pesticidal compositions comprising a pesticide and one or more acidifiers with one or more antagonists of the pesticide to create a tank mix and applying the tank mix to the weeds or an area in need of weed control.

4 Claims, No Drawings

PESTICIDAL COMPOSITIONS AND METHODS OF USE THEREOF

FIELD OF THE INVENTION

The present invention is directed to pesticidal compositions comprising a pesticide, one or more acidifiers and one or more antagonists of the pesticide. The present invention is further directed to methods of controlling weeds by mixing pesticidal compositions comprising a pesticide and one or more acidifiers with one or more antagonists of the pesticide to create a tank mix and applying the tank mix to the weeds or an area in need of weed control.

BACKGROUND OF THE INVENTION

Grass herbicides or graminicides are effective against perennial and annual grasses. However, grass herbicides are not effective against all pests. To save time, money and resources grass herbicides are often tank mixed with other pesticides to control a range of pests. These additional pesticides may antagonize the activity of grass herbicides on grassy weeds.

For example, it is commonly known that certain classes of broadleaf herbicides can reduce the activity of grass herbicides such as dim herbicides. To counteract this antagonism dim herbicides are used along with a crop oil concentrate. However, the addition of crop oil concentrate is not sufficient to counteract the antagonism of dim herbicides by every pesticide.

A more specific example is the antagonism of clethodim by acetochlor (acetochlor is available in Warrant®). Acetochlor is a broad leaf herbicide. Tank mixes of the dim herbicide, clethodim, and acetochlor result in a reduction in the effectiveness of clethodim. To combat this antagonism growers are directed to increase the concentrations of clethodim and decrease the concentrations of acetochlor. However, this method results in undesirable control of weeds.

Accordingly, there is a need for pesticidal compositions that inhibit the antagonism of the pesticide and allow for tank mixing of effective concentrations of the pesticide and its antagonist.

SUMMARY OF THE INVENTION

In one embodiment, the present invention is directed to pesticidal compositions comprising a pesticide, one or more acidifiers and one or more antagonists of the pesticide.

In another embodiment, the present invention is directed to a method of controlling weeds comprising:

mixing compositions comprising a pesticide and one or more acidifiers with one or more antagonists to the pesticide to create a tank mix; and applying the tank mix to the weeds or an area in need of weed control.

DETAILED DESCRIPTION OF THE INVENTION

It was surprisingly discovered that the addition of an acidifier to compositions containing a pesticide allowed tank mixing with an antagonist of the pesticide without a reduction in efficacy of the pesticide. This finding was unexpected because a reduction in pH had not been previously described to inhibit antagonism.

Compositions of the present invention containing a pesticide and an acidifier will provide the end user with tank mix compatibility with an antagonist of the pesticide. The composition will also provide effective control of grasses.

In one embodiment, the present invention is directed to agricultural compositions comprising a pesticide, one or more acidifiers and one or more antagonists of the pesticide.

Pesticides suitable for use in the present invention include, but are not limited to, one or more grass herbicides. Grass herbicides include, but are not limited to, graminicides. Graminicides include Group 1 and Group 2 herbicides. Group 1 herbicides include dim herbicides, fop herbicides and den herbicides. Dim herbicides include, but are not limited to, clethodim and sethoxydim. Fop herbicides include, but are not limited to, fluazifop, clodinafop-propargyl, fenoxyprop-p-ethyl and quizalofop-p-ethyl. Den herbicides include, but are not limited to, pinoxaden. Group 2 herbicides include imidazolines, sulfonylaminocarbonyltriazolinones, sulfonylureas, pyrimidinyl(thio)benzoates, triazolpyramidines and triazolones. Imidazolines include, but are not limited to, AC 299, AC 263, 120AS, imazamethabenz, imazamox, imazapyr and imazethapyr. Sulfonylaminocarbonyltriazolinones include, but are not limited to, flucarbazone sodium. Sulfonylureas include, but are not limited to, chlorsulfuron and ethametsulfuron methyl, metsulfuron-methyl, nicosulfuron, rimsulfuron, thifensulfuron-methyl, tribenuron-methyl and triflusulfuron methyl. Pyrimidinyl(thio)benzoates include, but are not limited to, bispyribac. Triazolpyramidines include, but are not limited to, florasulam and pyroxsulam. Triazolones include, but are not limited to, thiencarbazone-methyl.

Acidifiers that may be used in compositions of the present invention include, but are not limited to, sulfuric acid; a mixture of alkyl polyoxyethylene ether, methylacetic acid and phosphatidylcholine; a mixture of carboxylic acids, phosphoric acids and ammoniated ions; and a mixture of trisodium citrate dihydrate, alkyl polyglucoside, monocarbamide, dihydrogen sulfate and tallow amine ethoxylate. In a preferred embodiment the acidifier is a mixture of alkyl polyoxyethylene ether, methylacetic acid and phosphatidylcholine.

Acidifiers may be present in compositions of the present invention at a concentration sufficient to maintain a pH of 5.3 or less for at least 2 hours.

In a preferred embodiment, compositions of the present invention have a pH of 5.3 or less, preferably 5.0 or less even more preferably 4.75 or less.

In another embodiment, compositions of the present invention may have a pH from about 3.0 to about 5.3 or from about 4.0 to about 5.0 and even more preferably from about 4.1 to about 4.75.

Antagonists of the pesticide suitable for use in the present invention may include a second pesticide. The second pesticide may be an herbicide including, but not limited to, 2,4-D choline (sold under the trade names Enlist One™ and Enlist Duo® registered to an available from Dow AgroSciences LLC), 2,4-D ester, 2,4-D amine, dicamba (sold under trade names Banvel® and Clarity® registered to and available from BASF Corporation and XtendiMax® registered to and available from Monsanto, Inc.), clopyralid (sold under trade name Stinger® registered to and available from Dow AgroSciences LLC), flumiclorac pentyl ester (sold under trade name Resource® registered to and available from Valent U.S.A. LLC), cloransulam-methyl (sold under trade name FirstRate® registered to and available from Dow AgroSciences LLC), lactofen (sold under trade names Cobra® and Phoenix® registered to an available from Valent U.S.A. LLC), imazethapyr (sold under trade name Pursuit® registered to and available from BASF Corporation), fomesafen (sold under trade name Flexstar® registered to and available from Syngenta Participations AG Corporation), imazamox (sold under trade name Raptor® registered to and available from BASF Corporation), thifensulfuron-methyl (sold under trade name Harmony® registered to and available from E.I. du Pont de Nemours and Company), glyphosate (sold under trade names Roundup® registered to and available from Monsanto, Inc. and Touchdown® registered to and available from Syngenta Participations AG Corporation), acifluorfen (sold under trade name Ultra Blazer® registered to and available from United Phosphorus, Inc.), bentazon/acifluorfen (sold under trade name Storm® registered to and available from United Phosphorus, Inc.), bentazon (sold under trade name Basagran® registered to and available from Winfield Solutions, LLC), octanoic acid ester of bromoxynil (sold under trade name Buctril® registered to and available from Bayer CropScience), 2-methyl-4-chlorophenoxyacetic acid, glufosinate (sold under trade name Liberty® registered to and available from Bayer Crop Science), acetochlor (sold under trade name Warrant® registered to and available from available from Monsanto, Inc.), acetochlor/fomesafen (sold under trade name Warrant® Ultra registered to and available from available from Monsanto, Inc.), s-metolachlor (sold under trade name Dual II Magnum® registered to and available from Syngenta Participations AG Corporation), fomesafen (sold under trade name Reflex® registered to and available from Syngenta Participations AG Corporation), dimethenamid-P (sold under trade name Outlook® registered to and available from BASF Corporation), fluthiacet-methyl (sold under trade name Cadet® registered to and available from FMC Corporation), s-metolachlor/fomesafen (sold under trade name Prefix® registered to and available from Syngenta Participations AG Corporation), pyroxasulfone (sold under trade name Zidua® registered to and available from BASF Corporation), s-metolachlor/glyphosate (sold under trade name Sequence® registered to and available from Syngenta Participations AG Corporation), pyroxasulfone/fluthiacet-methyl (sold under trade name Anthem® registered to and available from FMC Corporation) or a mixture thereof. Antagonist to the pesticide cannot be the pesticide itself.

The second pesticide may be an insecticide and/or a miticide including, but not limited to, lambda-cyhalothrin (sold under trade name Warrior II available from Syngenta Participations AG Corporation), permethrin (sold under trade name Pounce® registered to and available from FMC Corporation), chlorpyrifos (sold under trade name Lorsban® registered to and available from Dow AgroSciences LLC), esfenvalerate (sold under trade name Asana® XL registered to and available from Valent U.S.A. LLC), oxamyl (sold under trade name Vydate® registered to and available from E.I. du Pont de Nemours and Company), zeta-cypermethrin (sold under trade name Mustang® Maxx registered to and available from FMC Corporation), gamma-cyhalthrin (sold under trade name Delcare® registered to and available from FMC Corporation), etoxazole (sold under trade name Zeal® registered to and available from Valent U.S.A. LLC) or a mixture thereof.

The second pesticide may be a fungicide including, but not limited to, pyraclostrobin (sold under trade name Headline® registered to and available from BASF Corporation), azoxystrobin (sold under trade name Quadris® available from Syngenta Participations AG Corporation), trifloxystrobin (sold under trade name Gem® registered to and available from Bayer CropScience), tetraconazole (sold under trade names Eminent® and Domark® registered to and available from Isagro S.p.A.), metconazole (sold under trade name Quash® registered to and available from Valent U.S.A. LLC), propiconazole (sold under trade name Tilt® available from Syngenta Participations AG Corporation), flutriafol (sold under trade name Topguard® registered to and available from FMC Corporation), pydiflumetofen (sold under trade name Miravis® registered to and available from Syngenta Participations AG Corporation), benzovindiflupyr/azoxystrobin/propiconazole (sold under trade name Trivapro® registered to and available from Syngenta Participations AG Corporation), benzovindiflupyr/azoxystrobin (sold under trade name Elatus® registered to and available from Syngenta Participations AG Corporation), fluxapyroxad (sold under trade name Priaxor® registered to and available from BASF Corporation), and prothioconazole/trifloxystrobin (sold under trade name Stratego® YLD registered to and available from Bayer CropScience), axozystrobin/propiconazole (sold under trade name Quilt® registered to and available from Syngenta Participations AG Corporation) or a mixture thereof.

The second pesticide may include binary, tertiary or quaternary mixtures of an herbicide, an insecticide, a miticide and a fungicide.

In another embodiment, the present invention is directed to methods of controlling weeds comprising:

mixing compositions comprising a pesticide and one or more acidifiers with one or more antagonists to the pesticide to create a tank mix; and applying the tank mix to the weeds or an area in need of weed control.

The pesticide may be applied at a rate effective for the control of target pests. These rates are known to a person having ordinary skill in the art or may be derived using methods known in the art.

The compositions of the present invention can be applied to any environment in need of weed control. The environment in need of weed control may include any area that is desired to have a reduced number of weeds or to be free of weeds. For example, the composition can be applied to an area used to grow crop plants, such as a field, orchard, or vineyard. For example, compositions and methods of the present invention can be applied to areas where soybeans, corn, peanuts, and cotton are growing. In a preferred embodiment, the composition is applied in an area where a broadleaf crop (soybean, cotton, peanut, orchard, vineyard, forages) is growing. The compositions of the present invention can also be applied to non-agricultural areas in need of weed control such as lawns, golf courses, or parks.

The compositions of the present invention can be applied by any convenient means. Those skilled in the art are familiar with the modes of application that include foliar applications such as spraying, chemigation (a process of applying the composition through the irrigation system), by granular application, or by impregnating the composition on fertilizer.

The compositions of the present invention can be prepared as concentrate formulations or as ready-to-use formulations. The compositions can be tank mixed.

The compositions and methods of the present invention can be applied to areas where genetically modified crops ("GMOs") or non-GMO crops are growing. The term "GMO crops" as used herein refers to crops that are genetically modified.

In a preferred embodiment, the weeds controlled by the methods of the present invention include, but are not limited to, volunteer corn, fall panicum, giant foxtail, large crabgrass and barnyard grass.

In another preferred embodiment, the area in need of weed control includes, but is not limited to, alfalfa fields, bean fields, pea fields, edible-podded legume vegetable fields, peanut fields, potato fields, sunflower fields, artichoke fields, asparagus fields, bushberry fields, caneberry fields, carrot fields, clover fields, cranberry fields, cucurbit fields, flax fields, fruiting vegetable fields, garden beet fields, garlic fields, head and stem brassica vegetable fields, herb fields, hops fields, leaf petiole fields, leafy brassica green fields, leaf green fields, mint fields, mustard fields, root vegetable fields, safflower fields, sesame fields, shallot fields, strawberry fields, sweet potato fields, sugar beet fields, canola fields, onion fields, cotton fields, soybean fields, corn fields, orchards, plant nurseries, gardens, fallow lands, row middles, right of ways, building sites, residential landscapes, commercial landscapes, forests and aquatic sites such as ponds and lakes.

Throughout the application, the singular forms "a," "an," and "the" include plural reference unless the context clearly dictates otherwise.

As used herein, v/v denotes volume by total volume of the composition.

As used herein, w/w denotes weight by total weight of the composition.

As used herein, all numerical values relating to amounts, weight percentages and the like are defined as "about" or "approximately" each particular value, plus or minus 10%. For example, the phrase "at least 5.0% by weight" is to be understood as "at least 4.5% to 5.5% by weight." Therefore, amounts within 10% of the claimed values are encompassed by the scope of the claims.

These representative embodiments are in no way limiting and are described solely to illustrate some aspects of the invention.

Further, the following example is offered by way of illustration only and not by way of limitation.

EXAMPLES

SelectMAX® is used as the source of clethodim and is a registered trademark of and available from Valent.

Fusilad® is used as the source of fluazifop and is a registered trademark of and available from Syngenta.

XtendiMax® is used as the source of dicamba and is a registered trademark of and available from Monsanto.

Warrant® is used as the source of acetochlor and is a registered trademark of and available from Monsanto.

Zidua® is used as the source of pyroxasulfone and is a registered trademark of and available from BASF SE.

Agridex® is used as the source of crop oil concentrate and is a registered trademark of and available from Bayer CropScience.

LI 700® is used as the source of a mixture of alkyl polyoxyethylene ether, methylacetic acid and phosphatidylcholine and is a registered trademark of and available from Loveland Products, Inc.

Spectra Max Tank Mix is used as the source of a mixture of ammonium sulfate, glycerol, phosphoric acid, polyacrylamide, and polydimethylsiloxane and is available from KALO, Inc.

FS Transform™ is used as the source of a mixture of carboxylic acids, phosphoric acids and ammoniated ions and is available from Growmark.

Jackhammer™ is used as the source of a mixture of urea, ammonium nitrate, alcohol ethoxylate and propionic acid and is available from West Central.

Intact™ contains 43.18% polyethylene glycol, choline chloride and guar gum and is available from Precision laboratories.

Example 1—Effects of an Acidifier on the Antagonism of Clethodim by Acetochlor Method Volunteer corn was grown in Lahas, Puerto Rico starting in December 2018 to until the corn was at V6 stage or 15 inches in height. Distinct plots of volunteer corn were then sprayed with various mixtures of clethodim, acetochlor, dicamba and LI 700® as described in Table 1, below. All compositions contained 1.0% v/v Agridex® crop oil concentrates. All compositions containing dicamba also contain 0.5% v/v Intact™ (43.18% polyethylene glycol, choline chloride, guar gum).

Numbers of dead plants were tallied at 6 and 13 days after treatment and are represented as % control in Table 1, below. % control of volunteer corn is calculated as the number of plants killed divided by the total number of plants. Statistical significance is shown by letters wherein values sharing a letter are not statistically different.

Results

As can be seen in Table 1 below, the addition of an acidifier to mixtures of clethodim and acetochlor inhibited the antagonism of clethodim by acetochlor on volunteer corn. Specifically, a mixture of clethodim and acetochlor provided 52.5% and 91.8% control of 15-inch volunteer corn at 6 and 13 days after treatment ("DAT"). However, the addition of an acidifier increased control of 15-inch volunteer corn to 65% and 99.4% control at 6 and 13 DAT, respectively.

TABLE 1

Control of 15-inch volunteer corn

| Active Ingredients | Rate (L/HA) | % Control 6 DAT | % Control 13 DAT |
|---|---|---|---|
| Untreated | 0 | 0 | 0 |
| Clethodim | 0.44 | 85.0 | 98.8ab |
| Dicamba | 1.61 | | |
| Clethodim | 0.44 | 52.5 | 91.8b |
| Acetochlor | 2.92 | | |
| Clethodim | 0.44 | | |
| Dicamba | 1.61 | 85.0 | 98.8ab |
| Acetochlor | 2.92 | | |
| Clethodim | 0.44 | 40.0 | 92.7b |
| Acidifier* | | | |
| Clethodim | 0.44 | 65.0 | 99.4a |
| Acetochlor | 2.92 | | |
| Acidifier* | | | |
| Clethodim | 0.44 | 60.0 | 99.9a |
| Dicamba | 1.61 | | |
| Acidifier* | | | |
| Clethodim | 0.44 | 60.0 | 99.9a |
| Dicamba | 1.61 | | |
| Acetochlor | 2.92 | | |
| Acidifier* | | | |

*LI 700

Example 2—Effects of an Acidifier on the Antagonism of Clethodim by Acetochlor Method Volunteer corn was grown in Lahas, Puerto Rico starting in December 2018 to until the corn was at 12, 24 and 36 inches in height. Distinct plots of volunteer corn were then sprayed with various mixtures of clethodim or fluazifop, acetochlor, dicamba, pyroxasulfone and/or an acidifier as described in Table 2, below. All compositions contained 1.0% v/v Agridex® crop oil concentrates. All compositions containing dicamba also contain 0.5% v/v Intact™ (43.18% polyethylene glycol, choline chloride, guar gum).

Numbers of dead plants were tallied at 13 days after treatment and are represented as control in Table 2, below. % control of volunteer corn is calculated as the number of plants killed divided by the total number of plants.

Results

As can be seen in Table 2 below, the addition of an acidifier to mixtures of clethodim, dicamba and acetochlor inhibited the antagonism of clethodim by acetochlor on volunteer corn. Specifically, a mixture of clethodim, dicamba and acetochlor provided 80.0%, 88.3% and 50% control of 12, 24, and 36-inch volunteer corn, respectively. However, the addition of an acidifier increased control of 12, 24, and 36-inch volunteer corn to 96.0%, 90.0% and 86.7% control, respectively.

TABLE 2

Control of 12-inch, 24-inch and 36-inch volunteer corn

| Active Ingredients | Rate (L/HA) | % Control 12-inch | % Control 24-inch | % Control 36-inch |
|---|---|---|---|---|
| Untreated | 0 | 0 | 0 | 0 |
| Clethodim | 0.44/0.66/0.88^ | 80.0 | 88.3 | 50.0 |
| Dicamba | 1.61 | | | |
| Acetochlor | 2.92 | | | |
| Clethodim | 0.44/0.66/0.88^ | 96.0 | 90.0 | 86.7 |
| Dicamba | 1.61 | | | |
| Acetochlor | 2.92 | | | |
| Acidifier* | | | | |
| Fluazifop | 0.37/0.37/0.44^ | 86.7 | 96.3 | 88.3 |
| Dicamba | 1.61 | | | |
| Acetochlor | 2.92 | | | |
| Acidifier* | | | | |
| Clethodim | 0.44/0.66/0.88^ | 88.3 | 91.7 | 91.7 |
| Dicamba | 1.61 | | | |
| Pyroxasulfone | 0.11 | | | |

^Rate at application to 12-inch, 24-inch and 36-inch volunteer corn, respectively
*LI 700

Example 3—Effects of Various Acidifiers on the Antagonism of Clethodim by Acetochlor in Volunteer Corn Method Volunteer corn was grown in Lahas, Puerto Rico starting in December 2018 to until the corn was at V6 growth stage. Distinct plots of volunteer corn were then sprayed with various mixtures of various mixtures of clethodim or fluazifop, acetochlor, dicamba, pyroxasulfone and/or an acidifier selected from LI 700®, Tank Max, sulfuric acid, FS Transform™ and Jackhammer™ as described in Table 3, below. All compositions contained 1.0% v/v Agridex® crop oil concentrates. All compositions containing dicamba also contain 0.5% v/v Intact™ (43.18% polyethylene glycol, choline chloride, guar gum).

Numbers of dead plants were tallied at 13 days after treatment and are represented as % control in Table 3, below. % control of volunteer corn is calculated as the number of plants killed divided by the total number of plants.

Results

As can be seen in Table 3 below, the addition of select acidifiers to mixtures of clethodim and acetochlor inhibited the antagonism of clethodim by acetochlor on volunteer corn. Specifically, a mixture of clethodim and acetochlor provided 88.3% control of volunteer corn. However, the addition of select acidifiers increased control of volunteer corn to from 97.7% to 99.7%. Further, acidifiers that reduced the pH from 6.0 for the positive control to less than 5.2 resulted in an increase in % control except for Jackhammer™.

TABLE 3

Control of volunteer corn with various acidifiers

| Active Ingredients | Rate (L/HA) | % Control |
|---|---|---|
| Untreated | 0 | 0 |
| Clethodim | 0.44 | 88.3bc |
| Dicamba | 1.61 | |
| Acetochlor | 2.92 | |
| pH 6.0 | | |
| Clethodim | 0.44 | 88.3bc |
| Dicamba | 1.61 | |
| Acetochlor | 2.92 | |
| Acidifier (Spectra Max) | | |
| pH 5.2 | | |
| Clethodim | 0.44 | 86.7c |
| Dicamba | 1.61 | |
| Acetochlor | 2.92 | |
| Acidifier (Jackhammer ™) | | |
| pH 4.6 | | |
| Clethodim | 0.44 | 97.7a |
| Dicamba | 1.61 | |
| Acetochlor | 2.92 | |
| Acidifier (Sulfuric acid) | | |
| pH 4.1 | | |
| Clethodim | 0.44 | 99.7a |
| Dicamba | 1.61 | |
| Acetochlor | 2.92 | |
| Acidifier (LI 700 ®) | | |
| pH 4.5 | | |
| Clethodim | 0.44 | 98.0a |
| Dicamba | 1.61 | |
| Acetochlor | 2.92 | |
| Acidifier (FS Transform ™) | | |
| pH 5.03 | | |
| Fluazifop | 0.44 | 97.7a |
| Dicamba | 1.61 | |
| Acetochlor | 2.92 | |
| Acidifier (LI 700 ®) | | |
| Clethodim | 0.44 | 91.4bc |
| Dicamba | 1.61 | |
| Pyroxasulfone | 0.11 | |

Example 4—Effects of Various Acidifiers on the Antagonism of Clethodim by Acetochlor in Barnyard Grass Method Barnyard grass was grown in Lahas, Puerto Rico starting in December 2018 to until the grass was at tillering stage. Distinct plots of barnyard grass were then sprayed with various mixtures of various mixtures of clethodim or fluazifop, acetochlor, dicamba, pyroxasulfone and/or an acidifier selected from LI 700®, Tank Max, sulfuric acid, FS Transform™ and Jackhammer™ as described in Table 3, below. All compositions contained 1.0% v/v Agridex® crop oil concentrates. All compositions containing dicamba also contain 0.5% v/v Intact™ (43.18% polyethylene glycol, choline chloride, guar gum).

Numbers of dead plants were tallied at 13 days after treatment and are represented as % control in Table 4, below. % control of barnyard grass is calculated as the number of plants killed divided by the total number of plants.

Results

As can be seen in Table 4 below, the addition of a select acidifiers to mixtures of clethodim and acetochlor inhibited the antagonism of clethodim by acetochlor on barnyard grass. Specifically, a mixture of clethodim and acetochlor provided 83.3% control of barnyard grass. However, the addition of select acidifiers increased control of barnyard grass to from 93.3% to 99%. Further, acidifiers that reduced the pH from 6.26 for the positive control to less than 5.38 resulted in an increase in % control.

TABLE 4

Control of barnyard grass with various acidifiers

| Active Ingredients | Rate (L/HA) | % Control |
|---|---|---|
| Untreated | 0 | 0 |
| Clethodim | 0.44 | 83.3c |
| Dicamba | 1.61 | |
| Acetochlor | 2.92 | |
| pH 6.26 | | |
| Clethodim | 0.44 | 80.0c |
| Dicamba | 1.61 | |
| Acetochlor | 2.92 | |
| Acidifier (Spectra Max) | | |
| pH 5.38 | | |
| Clethodim | 0.44 | 93.3ab |
| Dicamba | 1.61 | |
| Acetochlor | 2.92 | |
| Acidifier (Jackhammer ™) | | |
| pH 4.75 | | |
| Clethodim | 0.44 | 93.3ab |
| Dicamba | 1.61 | |
| Acetochlor | 2.92 | |
| Acidifier (Sulfuric acid) | | |
| pH 4.35 | | |
| Clethodim | 0.44 | 95.0bc |
| Dicamba | 1.61 | |
| Acetochlor | 2.92 | |
| Acidifier (LI 700 ®) | | |
| pH 4.65 | | |
| Clethodim | 0.44 | 99.0a |
| Dicamba | 1.61 | |
| Acetochlor | 2.92 | |
| Acidifier (FS Transform ™) | | |
| pH 4.39 | | |
| Fluazifop | 0.44 | 83.3bc |
| Dicamba | 1.61 | |
| Acetochlor | 2.92 | |
| Acidifier (LI 700 ®) | | |
| Clethodim | 0.44 | 83.3bc |
| Dicamba | 1.61 | |
| Pyroxasulfone | 0.11 | |

What is claimed is:

1. An agricultural composition comprising clethodim, dicamba and acetochlor and, one or more acidifiers, wherein the composition has a pH of 4.75 or less.

2. The composition of claim 1, wherein the one or more acidifiers is selected from the group consisting of: sulfuric acid; a mixture of alkyl polyoxyethylene ether, methylacetic acid and phosphatidylcholine; a mixture of carboxylic acids, phosphoric acids and ammoniated ions; and a mixture of trisodium citrate dihydrate, alkyl polyglucoside, monocarbamide, dihydrogen sulfate and tallow amine ethoxylate.

3. A method of controlling weeds comprising:
   a. mixing a composition comprising clethodim and one or more acidifiers with acetochlor and dicamba to create a tank mix; and
   b. applying the tank mix to the weeds or an area in need of weed control, wherein the composition has a pH of 4.75 or less.

4. The method of claim 3, wherein the one or more acidifiers is selected from the group consisting of: sulfuric acid; a mixture of alkyl polyoxyethylene ether, methylacetic acid and phosphatidylcholine; a mixture of carboxylic acids, phosphoric acids and ammoniated ions; and a mixture of trisodium citrate dihydrate, alkyl polyglucoside, monocarbamide, dihydrogen sulfate and tallow amine ethoxylate.

* * * * *